April 16, 1929.    R. E. FIELDER    1,709,255
DRIVING MECHANISM FOR MOTOR VEHICLES
Filed Nov. 25, 1925    5 Sheets-Sheet 4
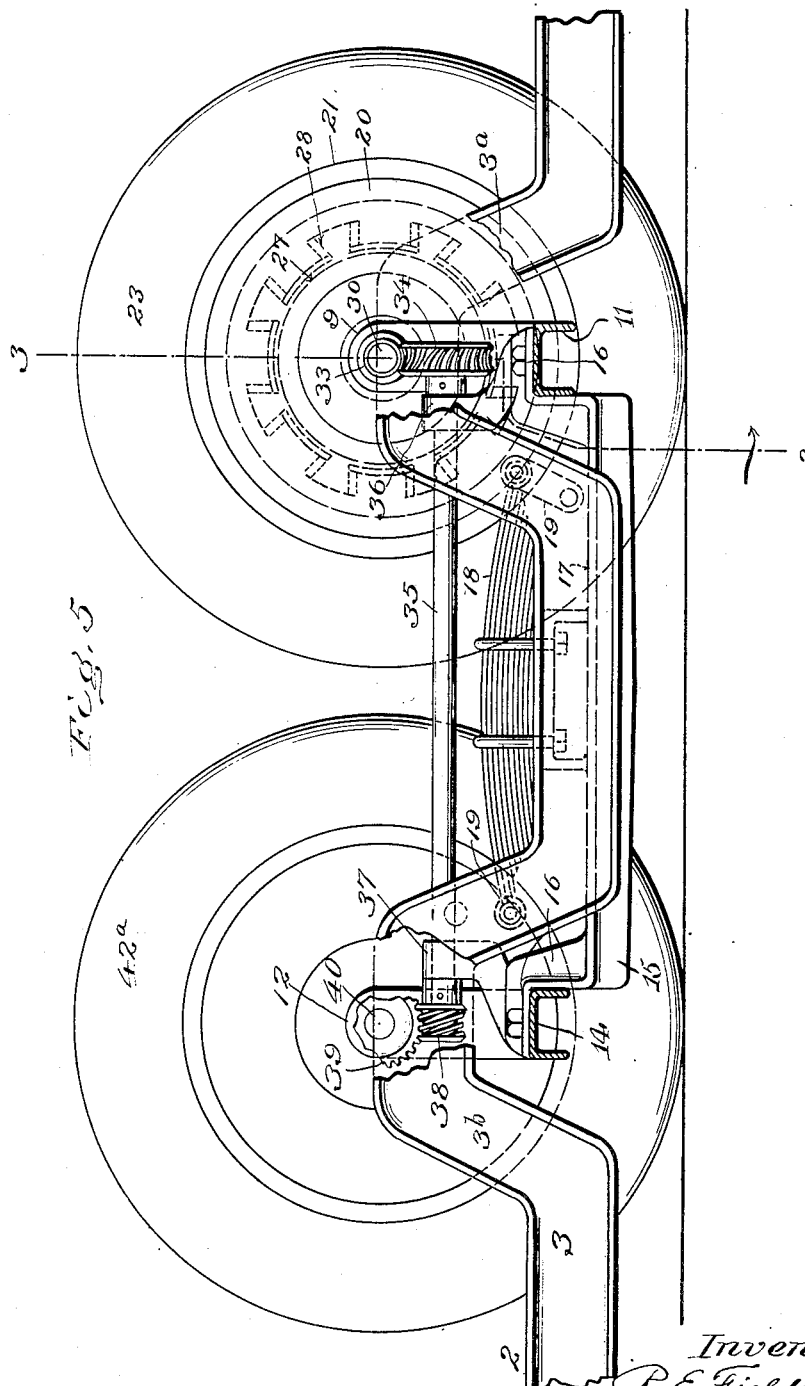

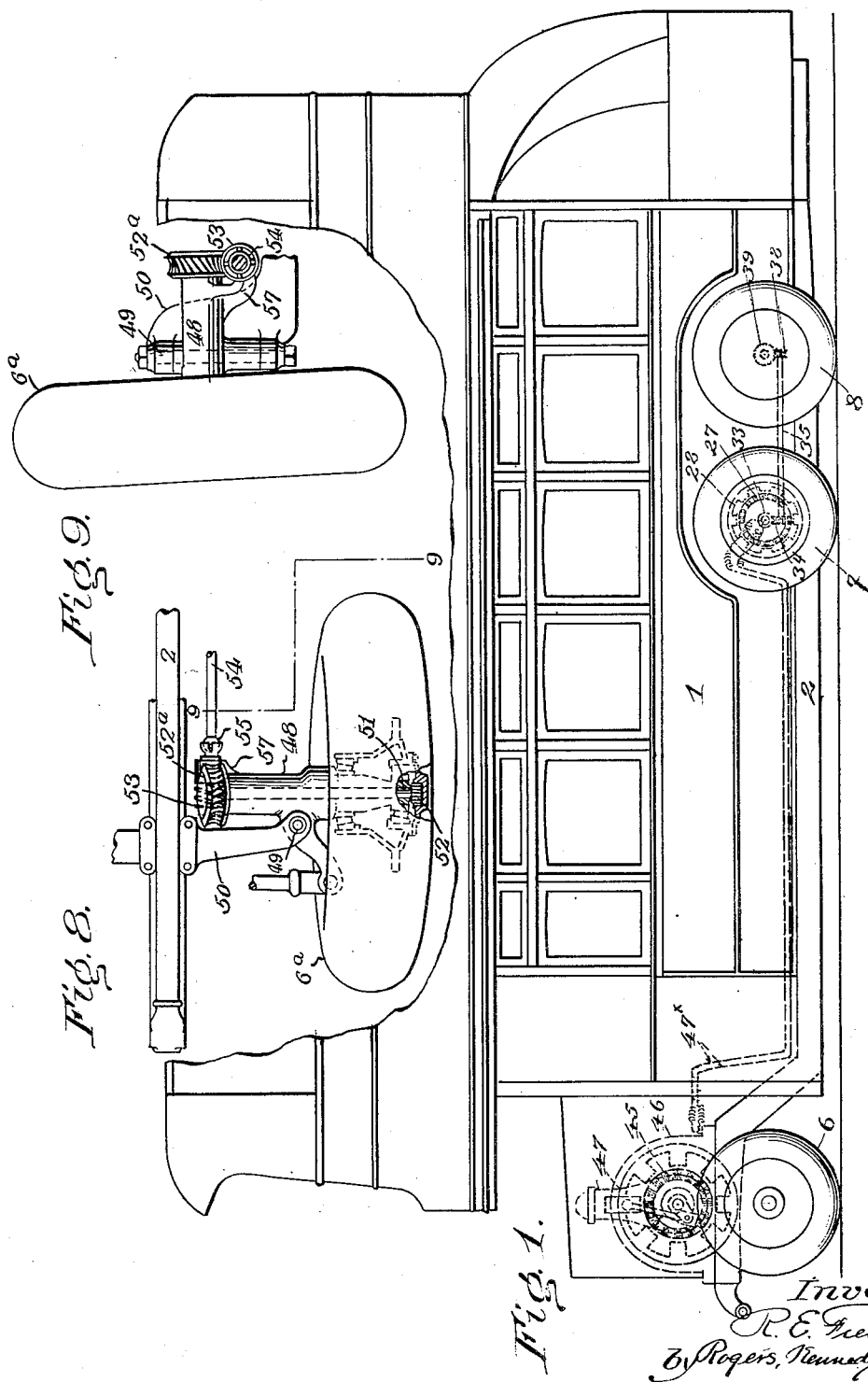

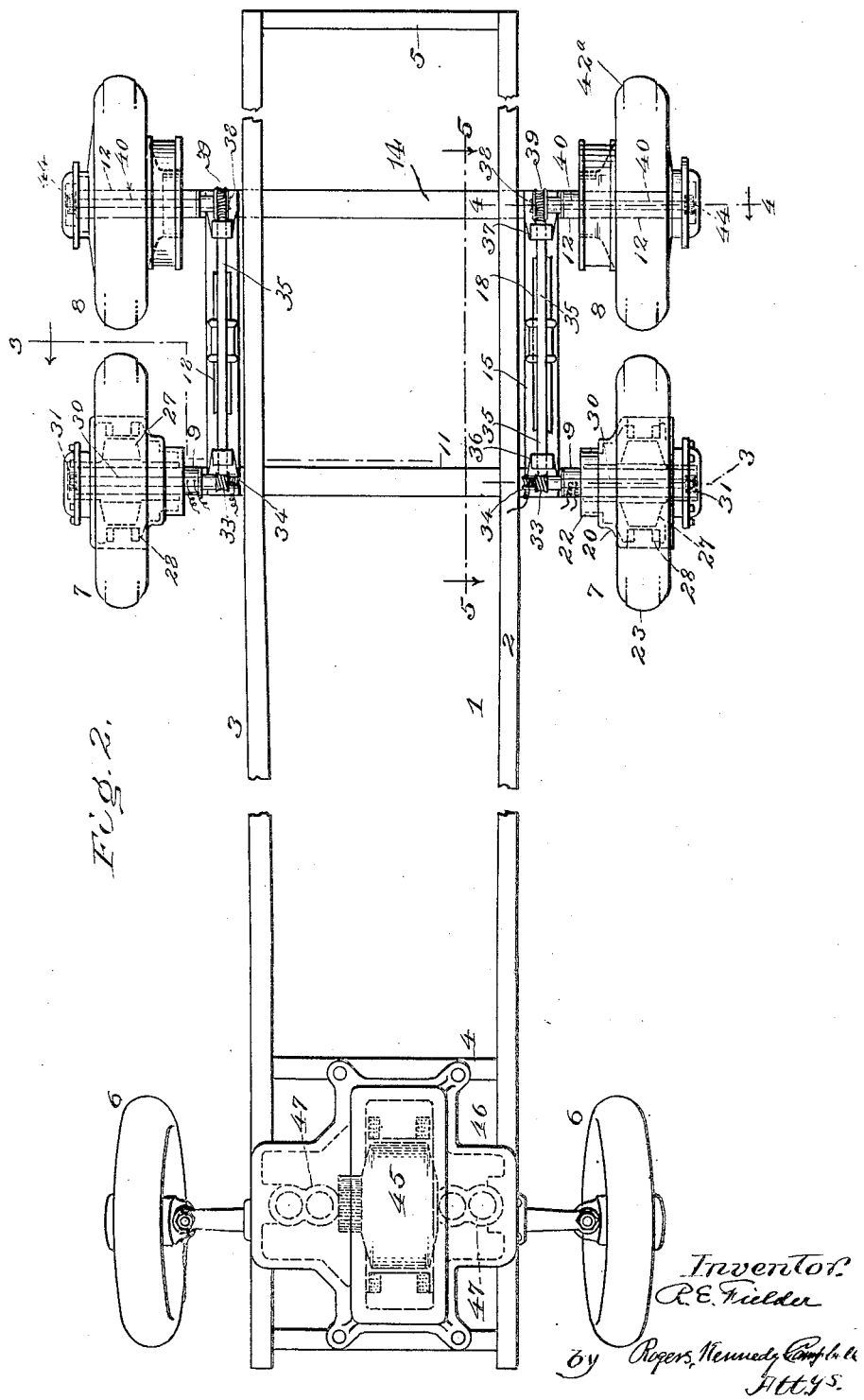

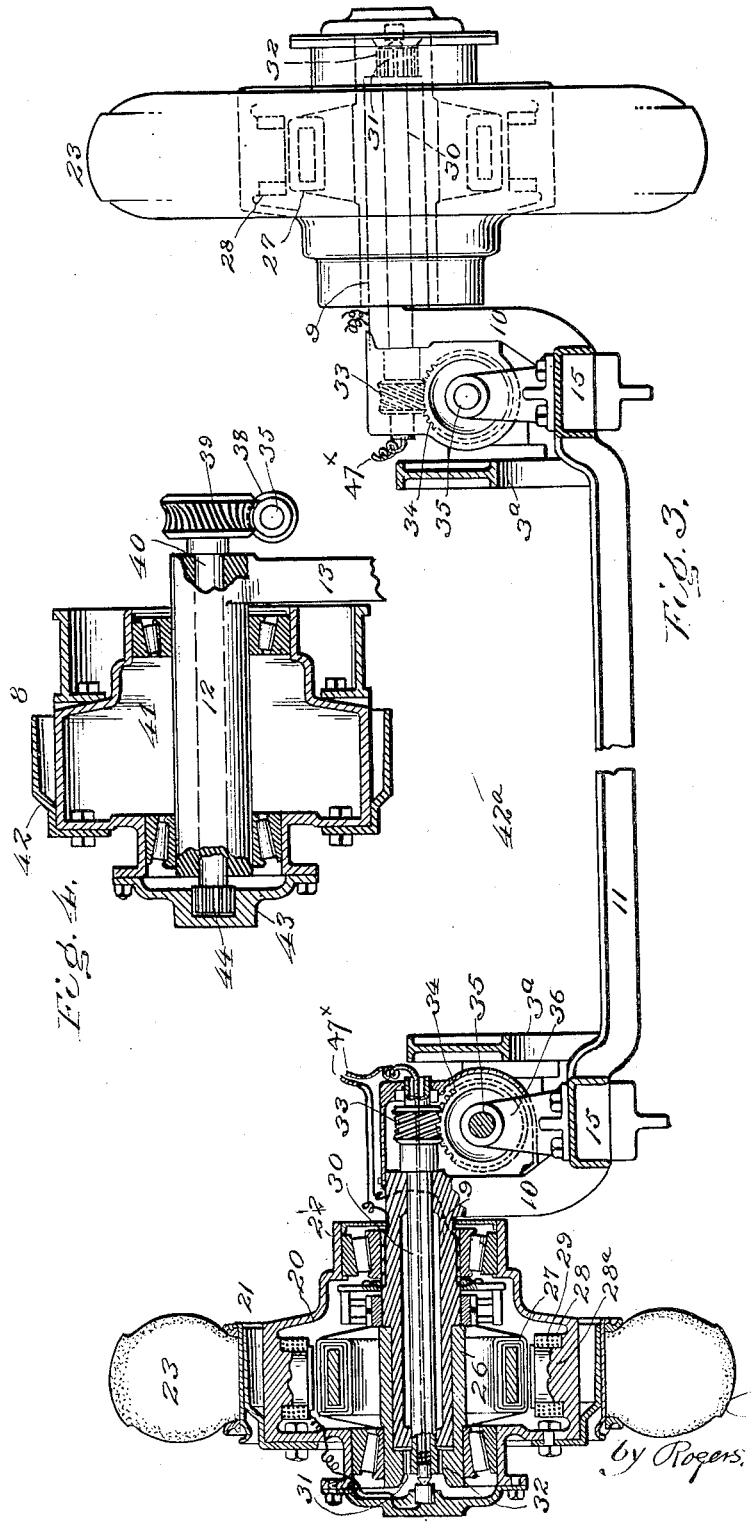

April 16, 1929.   R. E. FIELDER   1,709,255
DRIVING MECHANISM FOR MOTOR VEHICLES
Filed Nov. 25, 1925    5 Sheets-Sheet 5
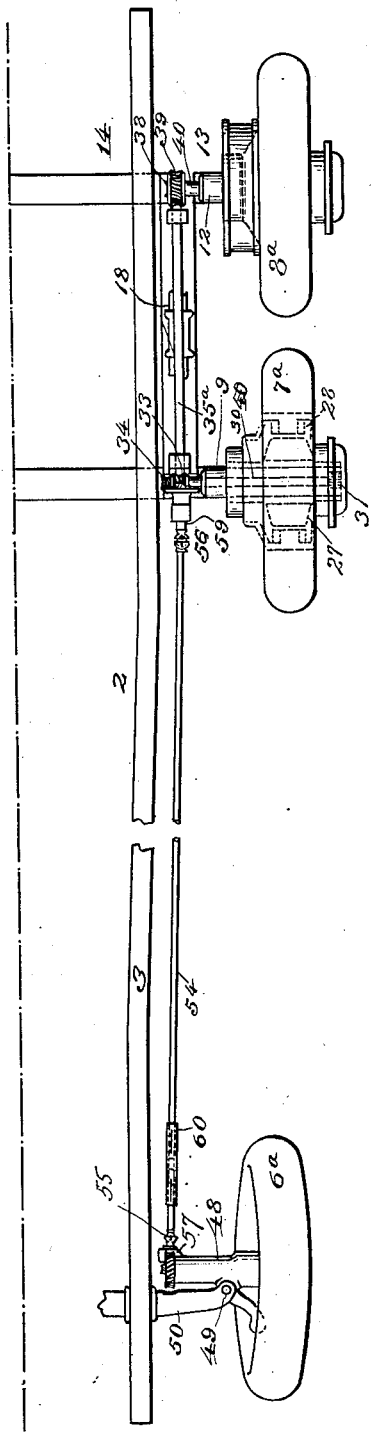
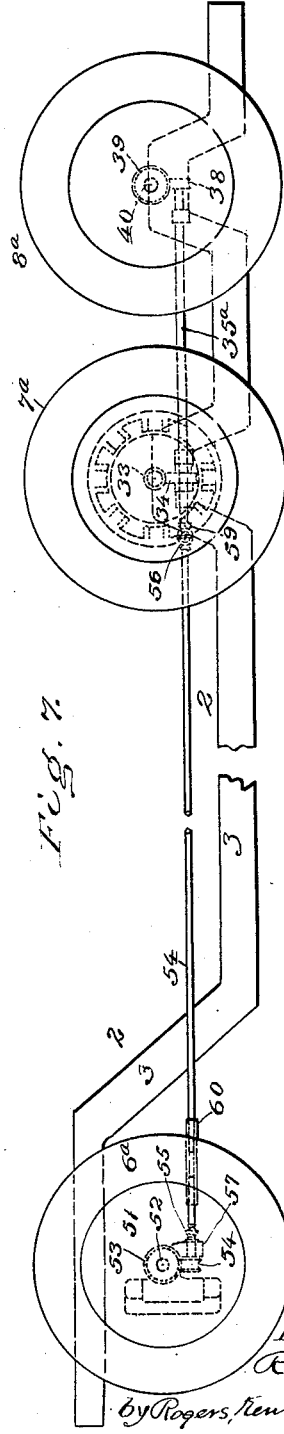

Patented Apr. 16, 1929.

1,709,255

UNITED STATES PATENT OFFICE.

REUBEN E. FIELDER, OF CHICAGO, ILLINOIS.

DRIVING MECHANISM FOR MOTOR VEHICLES.

Application filed November 25, 1925. Serial No. 71,330.

This invention relates to the drive of vehicles by the use of electricity as the motive power, and has reference more particularly to the application of such form of drive to motor busses, motor trucks, and the like.

The invention is directed to certain improvements in the type of electric drive for vehicles, in which an electric generator is driven by a gas or internal combustion engine or other engine, and the current from the generator supplied to electric motors which drive the supporting wheels, or certain of them.

One of the features of the invention resides in the relative location of the electric generator and the engine which drives the same, the said engine and generator, in accordance with my invention, being located one at the side of the other, as distinguished from "in tandem," whereby a very low level of floor of the maximum extent is permitted.

Another feature of the invention resides in the incorporation of the driving motors, in an improved manner, in the hubs of the supporting wheels and in the combination therewith of drive or ground wheels geared to said motors and driven therefrom; whereby greater tractive effect is afforded, a better support given to the vehicle, a distribution of the load over a greater area of roadway is permitted, and a very low level of the floor made possible.

These features and others involved in the improved construction and arrangement of the parts and their operation and advantages, will be fully described in detail in the specification to follow, and the novel parts thereof pointed out in the appended claims.

In the accompanying drawings:

Fig. 1 is a side elevation of a passenger vehicle or bus having my invention applied thereto.

Fig. 2 is a plan view, with the bus body removed, and showing the chassis frame, the driving mechanism, and wheels.

Fig. 3 is a transverse sectional elevation on an enlarged scale on the line 3—3 of Fig. 2.

Fig. 4 is a transverse sectional elevation on the line 4—4 of Fig. 2.

Fig. 5 is a longitudinal sectional elevation on an enlarged scale on the line 5—5 of Fig. 2 as viewed in the direction of the arrow on said line.

Fig. 6 is a plan view of one side of the chassis frame and driving mechanism, showing a modification of the invention to provide for a six wheel drive.

Fig. 7 is a side elevation of the same.

Fig. 8 is a plan view on an enlarged scale of one of the front steering wheels of the form of the invention illustrated in Fig. 7, showing the support for said wheel and the connections for driving the same.

Fig. 9 is a transverse sectional elevation of the same on the line 9—9 of Fig. 8.

Referring to the drawings:

Referring particularly to Figs. 1 to 5, 1 designates the body of a passenger carrying bus or vehicle in connection with which my invention is shown by way of example, and 2 designates the chassis frame thereof comprising the two fore-and-aft side frame members 3 connected together at the front by transverse frame members 4 and connected together at the rear by a transverse frame member 5, said chassis frame serving as usual to give support to the bus body. At the front the chassis frame is supported by front supporting and steering wheels 6 as usual, and at the rear by two pairs of supporting and driving or ground wheels, a forward pair 7, which in accordance with my invention embody electric driving motors, and which for convenience of description I will refer to as motor wheels, and a rear pair 8 which are geared to and driven by said motors, thereby constituting a four wheel electric drive which is characteristic of the form of the invention shown in Figs. 1 to 5.

The wheels 7 of the forward pair are rotatably mounted on fixed spindles 9 projecting outwardly from the upper ends of vertical arms 10 extending upwardly from the outer ends of a horizontal transverse load-carrying member 11. This load-carrying member extends below the side members of the chassis frame and outward beyond the same, the said side members being bent upwardly as at 3ª at the points of intersection of the member 11 therewith, in order not to interfere with the location of the load-carrying member at a low level, and to permit of the relative vertical movements of the chassis frame and the load-carrying member in the passage of the vehicle over obstructions.

The wheels 8 of the rear pair are rotatably supported on fixed spindles 12 projecting outwardly from the upper ends of vertical arms 13 extending upwardly from the outer ends of a horizontal transverse load-carrying member 14. This load-carrying member is located in rear of the member 11 just described, and extends below the side members of the chassis frame and outwardly beyond the same, the said side members being bent or offset upwardly at the intersections of the member 14 therewith as at 3ᵇ, for the same purpose as the upward bends 3ᵃ of said side members just described.

The transverse load supporting members 11 and 14 are connected together outward of the side members of the chassis frame, by means of two fore-and-aft tie bars 15 which are provided at their ends with horizontal feet 16 resting on and bolted fixedly to the outer ends of the respective members 11 and 14, and which tie bars are depressed or offset downwardly between their ends as at 17 to afford seats for the vehicle springs 18. These springs are fixedly clipped at their middles to the depressed seats of the tie bars, and they are shackled at their ends as at 19 to the side members of the chassis frame.

Each of the wheels 7, comprises, as best shown in Fig. 3, a hollow casing portion 20 formed with a rim portion 21, and a hub portion 22, to which rim portion a pneumatic tire 23 may be applied. The hub of the wheel is rotatably mounted at its outer end on a sleeve 26 rotatable on the outer portion of the spindle 9, and at its inner end on the inner portion of the spindle, inner and outer roller bearings being shown as interposed between the hub and said supporting parts. Within the casing portion of the wheel, the sleeve 26 is surrounded by a motor armature 27 which is fixed thereto and rotates therewith, and surrounding the motor armature, is a motor field 28 comprising pole pieces 28ᵃ extending inwardly radially from the rim portion of the motor wheel, which pole pieces are surrounded by magnetic field coils 29. The construction described constitutes an electric motor housed within and forming an internal part of the wheel 7, the motor armature being free to rotate in one direction, and the surrounding field fixed to the body of the wheel, being free to rotate in the opposite direction at a relatively different rate of speed, as will be more fully described later on.

The rotary motion of the sleeve 26 carrying the motor armature, is transmitted to a shaft 30 which is mounted for rotation in an axial bearing in the spindle 9, the outer end of the shaft being provided with teeth 31 which are engaged by driving teeth 32 formed on the interior of the outer end of the sleeve 26. At its inner end the shaft 30 has fixed to it a worm 33 which meshes with a worm wheel 34 on the forward end of a longitudinally extending shaft 35. The shaft 35 is mounted near its front end to rotate in a bearing formed in a bracket arm 36 fixed to and extending upwardly from the outer end of the load supporting member 11, and is mounted near its rear end to rotate in a rear bearing in a bracket arm 37 fixed to and extending upwardly from the outer end of the rear load supporting member 14. A worm 38 is fixed to the rear end of the shaft 35 and meshes with a worm wheel 39 on the inner end of a shaft 40 mounted to rotate in an axial bearing in the spindle 12 supporting the wheel 8 of the rear pair.

This rear wheel comprises a casing or hub portion 41 which is mounted to rotate on the spindle 12, and a rim portion 42 to which a pneumatic tire 42ᵃ is applied, the hub being provided with a cap 43 toothed on its interior and having driving engagement with a toothed head 44 on the outer end of the shaft 40, whereby rotation of shaft 40 through the intermediate gearing by the motor, will be transmitted positively to the rear wheel 8 and will drive the same.

It will be understood that there is a motor wheel 7 and its associated driving wheel 8 on each side of the vehicle, and that the driving connection between the wheels is the same on both sides, the wheels and their driving connections on one side being thus entirely independent of those on the other side, so that no differential gearing between the two sets of wheels will be required. The two sets of wheels being thus independently driven by electric motors, the electrical energy will flow in the required proportion to the wheels that requires the greater or lesser speed, or has the greater or lesser load, as the case may be.

On the supply of electrical energy to the motor wheels in the manner to be presently described, the armature will be rotated at high speed, say about 4000 R. P. M., but this speed is reduced by the form of reduction gearing described, so that the associated driven wheels will rotate at the proper speed for the desired conditions of operation, say about 250 R. P. M., which with a wheel of forty inches in diameter will give a travel of approximately thirty miles per hour. By gearing the motor armatures of the motor wheels to the associated driven wheels as above described, a positive drive of the driven wheels is obtained, yet the electrical reactions between the field coils of the electric motors operating in reverse direction to the rotation of the armatures, will give a forward propulsion to the motor wheels depending in value upon the resistance to the rotation of the armatures created by the tractive effect of the rear driven wheels.

The electric current for driving the motor wheels is supplied by an electric generator 45 at the front of the chassis frame, which generator is supported on a frame 46, supported in turn by the transverse frame members 4 of the chassis frame. The generator is driven by an internal combustion engine 47, in the present instance of the four cylinder type, which engine is supported by the frame 46 and has two of the cylinders disposed on either side of the generator in the same transverse plane thereof. This relative arrangement of the generator and engine structure gives the greatest economy in the space occupied by these elements, and enables the maximum extent of floor to be arranged at the lowest level desired without interference from the engine and generator. This is a very important desideratum in connection with motor busses, where for the convenience of the passengers in entering and leaving the same, the floor level should be low and unobstructed, which condition enables the overall height of the vehicles to be reduced and permits of the use of double deck vehicles on routes, particularly in cities, where overhead obstructions exist, such as trees, elevated railway structures, and the like.

The current from the generator is conducted to the motor wheels by conductors 47× leading from the generator rearwardly to the motor wheels as shown in Fig. 1, and making electrical connection with the motor elements as shown in Fig. 3, or in any other suitable manner familiar to those skilled in the art.

The form of the invention so far described provides a four-wheel drive for the vehicle, but it will be understood that the invention is not limited in this respect, as additional wheels may be provided to be driven from the motor wheels to constitute, for instance, a six-wheel drive. For this purpose the front steering wheels may be utilized as additional driving wheels as shown in the modified form of the invention illustrated in Figs. 6 to 9.

In these figures it will be seen that each of the front steering wheels is mounted for rotation on a horizontal fixed spindle 48 pivoted on a vertical axis as at 49 to a bracket arm 50 fixed to and extending outwardly from the side member of the chassis frame. A horizontal shaft 51 is journaled in an axial bearing in the spindle and is provided on its outer end with a toothed head 52 which has driving connection with an internally toothed cap on the hub of the wheel, whereby the wheel will be rotated by the rotation of the shaft. A worm wheel 52ᵃ is fixed to the inner end of shaft 51 and is engaged by a worm 53 on the forward end of a fore-and-aft extending shaft 54, which shaft is provided at its front with a gimbal joint 55 and at its rear with a gimbal joint 56. The end member of gimbal joint 55 is mounted in a bearing in a bracket 57 on the inner end of the spindle 48. The end member of the rear gimbal joint is connected with and supported by a forward extension 59 of the shaft 35ᵃ by which the motion of the motor armature is transmitted to the rear drive wheel 8ᵃ, so that the shafts 54 will be positively rotated by the motor wheels and will positively drive the front steering wheels. The shafts 54 are provided each near its front with an extensible coupling 60 which in connection with the gimbal joints will permit the shafts to accommodate themselves to the different angular positions of the steering wheels when the latter are turned on their axes in steering the vehicle.

In the operation of my improved electric driving mechanism, the speed of the vehicle will be controlled entirely by the output of the electric generator, which in turn will be controlled by the throttle of the engine, so that no change-speed gearing or gear shifting mechanism will be necessary in the system.

Among the advantages of my improved driving mechanism in respect to the positive drive of the road or driven wheels from the motor wheels, is the fact that four or more wheel tires are in contact with the road, thereby giving greater opportunity for suitable traction and retardation; better support is given the vehicle, and the load is more advantageously distributed over the roadway. The driving mechanism being within the contour of the road wheels, leaves an approximately free space between the chassis frame members which can be utilized for the comfort of the passengers, or for the storage of freight, and giving a very low floor level to any type of body applied. In passing over the inequalities of the roadway, the movement of any one wheel is transmitted in reduced proportions to the vehicle springs which are connected to the chassis frame at its center and between the motor wheels and drive wheels. A further feature of advantage is the ability to obtain a multiple wheel braking effect, even though the brakes are applied to only one set of the wheels, since with the method of electric control by the throttle pedal of the engine, the engine may be always left at "idling" speed sufficient to generate enough current to excite the fields and thereby providing enough electric drag to constitute in effect a multiple wheel braking action, and preventing skidding.

In the foregoing description and accompanying drawings I have set forth my invention in the particular detailed forms which will answer to realize the advantages and results aimed at. It will be understood however that these details may be variously changed and modified without departing from the spirit of the invention, and that the invention is not limited to any particular form or construction of the parts except in so far as such limitations are specified in the claims.

Having thus described my invention, what I claim is:

1. In a motor vehicle, the combination of a frame, motor wheels journaled thereon and supporting the frame, electric driving motors housed in said wheels and comprising each a motor armature and a motor field rotatable relatively to each other, and ground wheels journaled on the frame and geared to said motor armatures to be driven thereby.

2. In an electric driving mechanism for motor vehicles, the combination of a motor wheel adapted to support the frame and having housed therein an electric motor comprising a motor field fixed to the wheel and a motor armature surrounded by the field and rotatable relatively thereto, and a ground wheel associated with said motor wheel and having driving connection with said motor.

3. In a motor vehicle, the combination of a frame, motor wheels journaled thereon and supporting the frame, driving motors housed in said wheels and comprising each a motor field fixed to the wheel and a motor armature surrounded by the field and rotatable relatively thereto, driving members having driving connection with the armatures and driven thereby, and ground wheels journaled on the frame and geared to said driving members.

4. In a motor vehicle, the combination of a frame, motor wheels journaled thereon and supporting the frame, electric motors housed in said wheels and comprising each a motor field fixed to the wheel and a motor armature surrounded by the field and rotatable relatively thereto, driving shafts extending axially of the wheels and having driving connection with said armatures, power transmitting shafts driven by said driving shafts, and ground wheels journaled on the frame and geared to said power transmitting shafts.

5. In a motor vehicle, the combination of a frame, a motor wheel journaled thereon and supporting the frame, an electric motor housed in said wheel and comprising a motor field fixed to the wheel and a motor armature within said field and rotatable relatively thereto, a ground wheel journaled on the frame, and transmitting gearing between the motor armature and ground wheel to drive the latter.

6. In a motor vehicle, the combination of a frame, motor wheels journaled thereon and supporting the frame, electric motors housed in said wheels and comprising each a motor field fixed to the wheel and a motor armature surrounded by the field and rotatable relatively thereto, driving shafts extending axially of the wheels and driven by said armatures, power transmitting shafts operatively connected with the driving shafts by speed reducing gearing, and ground wheels journaled on the frame and geared to the power transmitting shafts.

7. In a motor vehicle, the combination of a frame, motor wheels journaled thereon and supporting the same, electric motors housed in said wheels and comprising each a motor field fixed to the wheel and a motor armature surrounded by the field and rotatable relatively thereto, ground wheels journaled on the frame, driving shafts extending axially of the ground wheels and in driving engagement therewith, and power transmitting shafts driven from the motor armatures and having driving engagement with said driving shafts.

8. In a motor vehicle, the combination of a frame, fixed wheel carrying spindles thereon, motor wheels journaled on said spindles to support the frame, electric motors housed in said wheels, driving shafts mounted in and extending axially of said spindles and driven by said motors, and ground wheels journaled on the frame and geared to said driving shafts.

9. In a motor vehicle, the combination of a frame, fixed wheel carrying spindles thereon, motor wheels journaled on said spindles to support the frame, electric motors housed in said wheels and comprising each a motor field fixed to the wheel and a motor armature surrounded by the field and supported on said spindle to rotate relatively to the field, a driving shaft rotatably mounted in the spindle and extending axially thereof, and ground wheels mounted on the frame and geared to said driving shafts and driven thereby.

10. In a motor vehicle, the combination of a frame, wheel supporting spindles thereon, motor wheels journaled on said spindles to support the frame, electric motors housed in said wheels and comprising each a motor field fixed to the wheel and a motor armature surrounded by the field and supported on the spindle to rotate relatively to the field, driving shafts rotatably mounted in the spindles and extending axially thereof and having driving connection with the motor armatures, ground wheel supporting spindles on the frame, ground wheels journaled on said spindles, driven shafts rotatably mounted in said spindles and extending axially thereof and having driving connection with the ground wheels, and power transmitting shafts extending between the motor wheels and ground wheels and geared respectively to the driving and driven shafts.

11. In a motor vehicle, the combination of a frame adapted to support the flooring of the vehicle, motor wheels journaled on the frame outward of the sides of the same, electric motors housed in said wheels, ground wheels associated with the motor wheels and journaled on said frame outward of the sides of the same, and power transmitting gearing between the motors and the ground wheels to drive the latter, said gearing being disposed outward of the floor space of the frame.

12. In a motor vehicle, the combination of a chassis frame comprising two fore-and-aft extending side frame members, two transverse load supporting members giving support to the chassis frame and extending at their ends outward of the said frame members, motor wheels journaled on the ends of one of said load supporting members, electric motors housed in said motor wheels, ground wheels journaled on the ends of the other load supporting member, and driving connections between the motors and the ground wheels disposed at the outer sides of said frame members.

13. In a motor vehicle, the combination of a chassis frame comprising two fore-and-aft extending side frame members, two transverse load supporting members extending beneath said frame members and terminating at their ends outward of the same, fore-and-aft extending tie bars connected respectively with said load supporting members, springs supported by said tie bars and connected with the chassis frame, motor wheels mounted on the ends of one of said load supporting members, electric motors housed in said wheels, ground wheels journaled on the ends of the other load supporting member, and driving connections between the motors and the ground wheels, said driving connections being supported by said tie bars.

14. In a driving mechanism for motor vehicles, the combination of a fixed supporting spindle on the frame of the vehicle, a sleeve rotatable on said spindle, a motor wheel rotatable on said sleeve and spindle, an electric motor housed in said wheel and comprising a motor field fixed to the wheel and a motor armature fixed to said sleeve, a driving shaft rotatably mounted in the spindle axially thereof and having driving connection with the sleeve, and a drive wheel journaled on the frame of the vehicle, and having driving connection with said driving shaft.

15. In a motor vehicle, the combination of a frame, steering wheels supporting the frame at the front, motor wheels supporting the frame in rear of the steering wheels, electric motors housed in said motor wheels, ground wheels supporting the frame in association with the motor wheels and driven from said motors, and driving connections between the motors and the steering wheels.

16. In a motor vehicle, the combination of a frame, steering wheels supporting said frame at the front, motor wheels supporting the frame in rear of the steering wheels, electric motors housed in said motor wheels, fore-and-aft extending power transmitting shafts geared to said motors and to the steering wheels for driving the latter, said shafts being provided with gimbal joints and with an extensible coupling to permit the shafts to accommodate themselves to the varying angular positions of the steering wheels.

In testimony whereof, I have affixed my signature hereto.

REUBEN E. FIELDER.